Dec. 29, 1931.  J. O. CARREY  1,839,085
LAPPING VALVE
Filed June 4, 1927   3 Sheets-Sheet 1

INVENTOR
John O. Carrey
By Cornwall, Bedell & James
ATTORNEYS

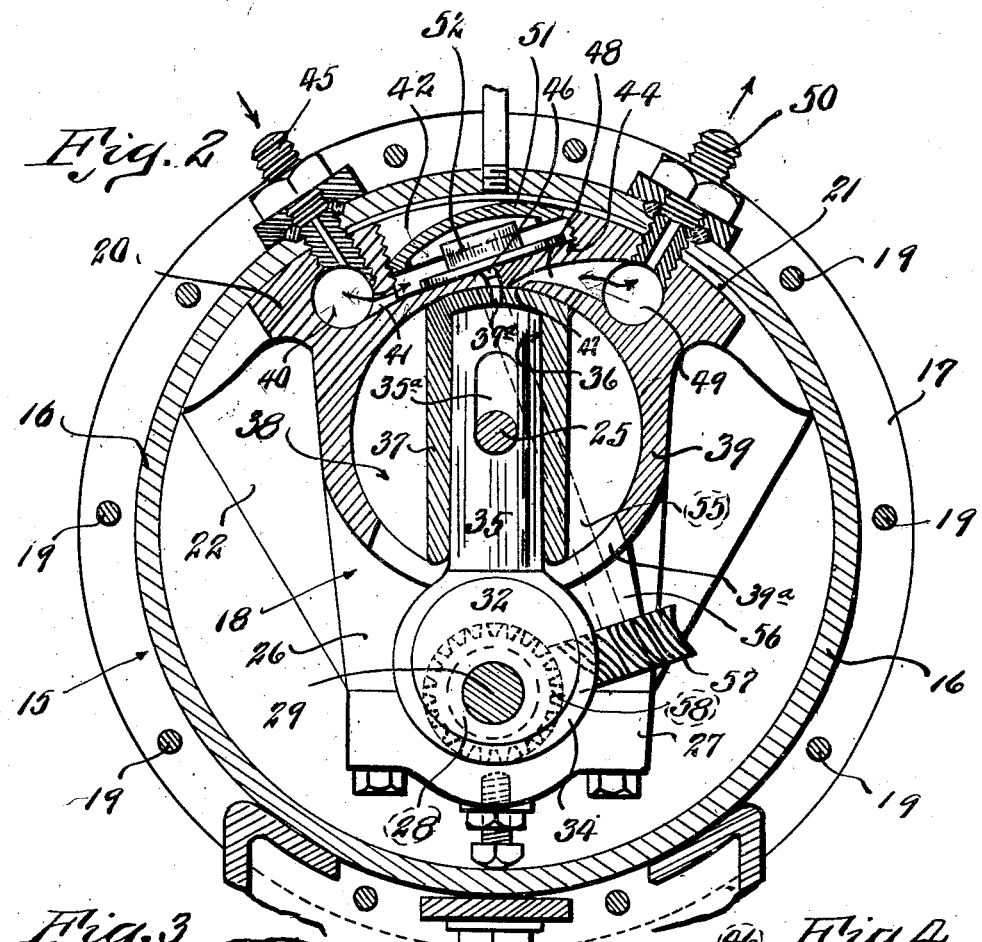
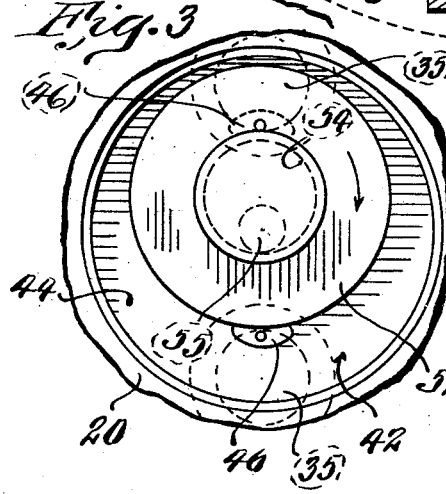
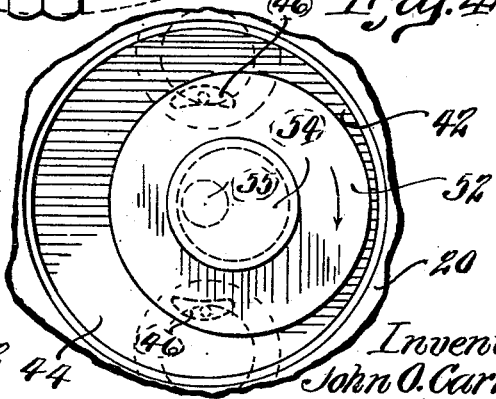

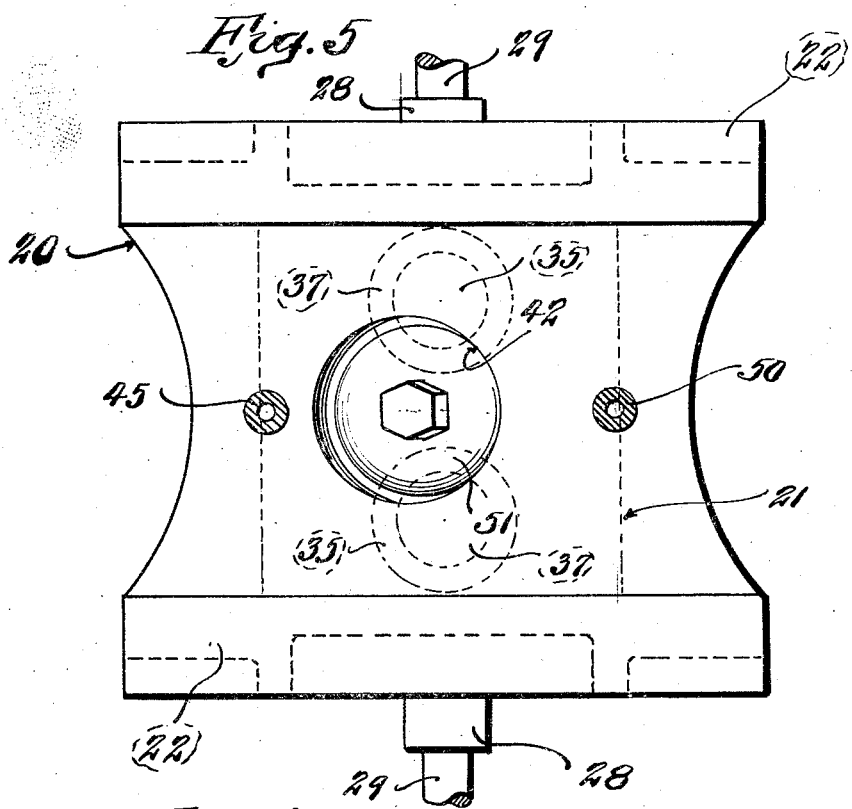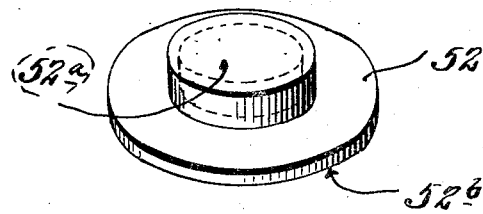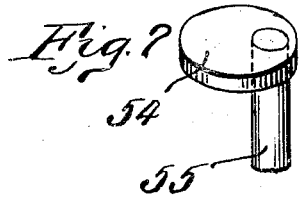

Patented Dec. 29, 1931

1,839,085

UNITED STATES PATENT OFFICE

JOHN O. CARREY, OF ST. LOUIS, MISSOURI, ASSIGNOR TO C & C ENGINEERING CO., INC., OF ST. LOUIS, MISSOURI, A CORPORATION OF MISSOURI

LAPPING VALVE

Application filed June 4, 1927. Serial No. 196,515.

This invention relates to new and useful improvements in valves and more particularly in lapping disk valves.

The objects of the invention are to provide a disk valve for controlling the ports of engines either of the explosive or expansion type, compressors, vacuum pumps and the like, and which is operable in correlated speed therewith.

Other objects of the invention are to provide a valve of the class described which is characterized by noiseless operation, forms a perfect seal and is subjected to very little wear.

Still further objects of the invention are to mount the valve so as to impart thereto a lapping operative motion for opening and closing the ports of the apparatus with which it is associated, said valve having a lapping engagement with the cooperating ported surface, thereby eliminating noises incidental to spring seated valves and enabling the cooperating faces to form a perfect seal at all times.

Still further objects of the invention are to provide simple means for imparting lapping motion to disk valves in correlation with the operation of the device with which said valves are associated.

Additional objects of the invention are to generally improve upon and simplify the construction of valves used for controlling the passage of fluid through suitable ports, said valves having a predetermined lapping movement relative to the ported faces with which they are associated.

With these and other objects in view, my invention consists of certain novel features and arrangements of parts hereinafter more fully described and illustrated in the accompanying specification and drawings, in which—

Figure 2 is a vertical cross section taken transversely through said device.

Figure 3 is a plan view partly in cross section of the port chamber with the valve arranged therein and showing one of the ports open.

Figure 4 is a similar view but showing the valve in moved position with ports closed.

Figure 5 is a top plan view of the cage in which the cylinders are mounted.

Figure 6 is a perspective detail view of the valve.

Figure 7 is a perspective detail view of the eccentric on which said valve is mounted.

Figure 1:
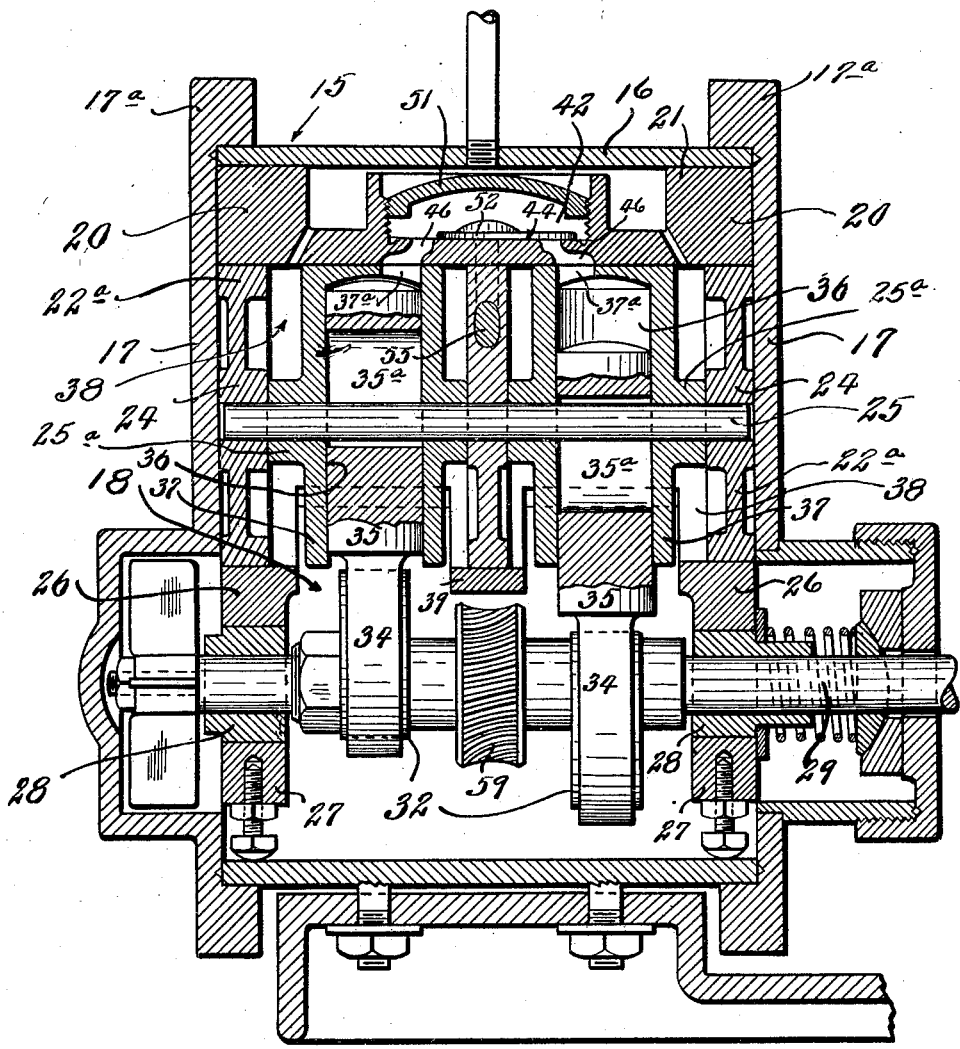
Figure 1 is a vertical cross section taken longitudinally through a fluid displacement device of my improved construction and showing my improved valve.

In the drawings is shown an improved type of a fluid displacement device which is similar in construction to the air compressor disclosed in my copending application Serial No. 163,141, filed January 24, 1927. This device comprises a casing 15 consisting of a tubular section 16 and end plates 17 which together enclose the operating mechanism 18 located within said casing. The end plates 17 are secured in position in any suitable manner preferably by means of bolts 19 which are located externally of the casing and serve to draw the end plates against the ends of said casing.

The compressing mechanism 18 is mounted in a cage or support 20 having an arcuate top portion 21 arranged against the underside of the upper half of the tubular section 16 and having end pieces 22 disposed adjacent to the respective end plates 17. End plates 22 are provided with removable circular disks 22a which are formed with bearings 24 for receiving a horizontally and longitudinally disposed shaft 25 and the lower ends of said end pieces 22 terminate in downwardly presented semi-circular boxes 26 adapted to have detachably secured thereto complementary semi-circular pieces 27 so as to clamp therebetween bearings 28 of a shaft 29.

A pair of eccentrics 32 are fixed on shaft 29 in spaced relation with each other and operating on each eccentric is an eccentric strap 34 of a piston 35, the latter being extended upwardly in a vertical plane with the respective eccentric and operating in a compressing chamber 36 of a cylinder 37. Cylinders 37 are arranged within support 22 and are provided with trunnions 25a which are mounted for oscillatory movement on shaft 25. Each piston 35 is provided with a vertically disposed slot 35a which slot is traversed by shaft 25. The length of the slot is slightly greater than the throw of the eccentric in order to allow reciprocating movement of piston 35 in compression chamber 36.

Cylinders 37 are arranged in chambers 38 which are formed by a horizontally disposed tubular portion 39 formed integrally with and depending from the top wall 21. Said cylinders are diametrically disposed in said tubular portion and are pivotally mounted on shaft 25 for oscillatory movement about the axis thereof. Segmental slots 39a are arranged in the lower portion of tubular section 39 for accommodating said cylinders 36 and providing clearance for the operating movements of pistons 35.

An outlet chamber 40 is formed in portion 21 and has a passage 41 leading into a valve chamber 42 which is located above said cylinders 37 and is provided with a flat bottom or face 44 which, in the present instance, is inclined from horizontal as shown in Figure 2. A discharge nipple 45 extends through an opening formed in casing 15 and is screw seated in top wall 21 and opens into the outlet chamber 40.

The face 44 is provided with a port 46 which connects chamber 42 with cylinder chambers 38. The upper end of each cylinder 37 is closed and the outer face of such end wall is convexed and is concentric with the axis of shaft 25. A slot 37a is formed in each end wall and is adapted to be brought, during the oscillatory movement of the cylinder, into register with said port 46 whereby communication can be established at proper intervals between chamber 42 and fluid displacement chamber 36 of cylinder 37.

An inlet port 47 is formed in chamber 38 in spaced relation with outlet port 46. This port 47 communicates through a suitable passage 48 with an intake chamber 49 into which extends, through casing 15, an intake nipple 50 which is screw seated in wall 21.

The high pressure chamber 42 is formed by forming an upwardly opening recess in wall portion 21 immediately above cylinder or cylinders 37 and screw seating therein a cap 51. The bottom face 44 of chamber 42 is inclined from horizontal in order to provide a wiping surface contact between it and a disk valve 52. This disk valve is arranged in chamber 42 and is actuated to open and close the ports 46 in definite relation with the reciprocating movements of pistons 35 and the oscillatory movements of cylinders 37. Said disk valve preferably receives eccentric rotary movement by means of an eccentric 54 which is fixed to the upper end of shaft 55 projecting into said chamber 42.

Valve 52 is provided with a central circular recess or pocket 52a which opens downwardly and terminates in the bottom face 52b of said disk. When the disk valve is in position the eccentric is contained and operates in said recess 52a.

Valve shaft 55 is disposed obliquely in order to clear trunnion shaft 25. The lower end of this shaft is journalled in a bearing 56 formed integral with the lower portion of tubular section 39 and is actuated by means of a gear 57 which is fixed to the extreme end of said shaft and meshes with a gear 58 fixed to operating shaft 29. The proportionate sizes of these gears are arranged so as to affect the operation of the disk valve in proper time relation with the operation of pistons 35.

Where two cylinders 37 are used chamber 42 is arranged centrally between said cylinders and gear 58 is fixed on shaft 29 substantially equi-distant from eccentrics 32. The ports 48 are disposed at diametrically opposite points appropriate distances from the axis of shaft 55 to provide proper opening and closing of said ports at the proper time and with the diameter of the disk valve and the throw of the eccentric of given dimensions. Thus said disk valve 52 receives eccentric rotary motion and has a lapping contact with the bottom of the ported face 44 thereby insuring perfect sealing between the two cooperating surfaces. As the two surfaces are in contact all the time the operation of the valve is practically noiseless and said valve is subjected to very little wear. No springs of any kind are necessary to insure sealing contact between the two surfaces as the valve rests on the bottom of the valve chamber and is preferably held thereagainst by the pressure prevailing in said valve chamber. Consequently there is no lost motion or vibration produced during the operation of the valve and said valve is positively actuated at all times and is held in proper sealing contact with said ported face 44.

When the device is used as an air compressor, pistons 35 are actuated by eccentrics 32 which are mounted on shaft 29 and are caused to reciprocate in cylinders 37, thereby compressing the air contained therein and forcing it under pressure through ports 46 into high pressure chamber 42. These ports 46 are controlled by gyratory disk 52 so as to open and close said ports in predetermined time relation with the actuation of pistons 35. The compressed air is discharged from high pressure chamber 42 through port 41 and chamber 40 and suitable connections (not shown) to which the nipple 45 is adapted to be connected. The air is drawn into the cylinders through intake ports 48 with which the port 37a of each cylinder 37 is adapted to register during the oscillation of said cylinder. This oscillatory movement is imparted to the cylinders 37 by means of pistons 35 and eccentrics 32. Shaft 29 is driven in any suitable manner, one end thereof being extended outwardly from the casing to receive suitable driving connections.

In the operation of the apparatus the lower portion of casing 16 is preferably filled with suitable lubricant which insures efficient lubrication of the actuating mechanism. This lubricant may be conveyed externally of the casing near the lower end thereof for the purpose of cooling said lubricant as indicated at 59. The cooled lubricant may then be admitted into the casing preferably at the highest point thereof so that said lubricant may be distributed to all of the operating parts of the mechanism and also serve to cool the valve chamber 42 as indicated at 60.

My improved valve can be advantageously used in compressors, vacuum pumps, engines and other fluid displacement devices wherein it is desired to control the passage of fluid from one chamber into another in a predetermined time relation.

As the valve is not dependent on spring action, its accuracy is not impaired by long use and as it is maintained at all times in close contact with the ported face, the noises and wear incidental to poppet valves and spring valves, are thereby eliminated.

The valve being loosely mounted on its eccentric member, it is free during its operation, to creep and constantly change its position, so that the two cooperating surfaces are prevented from having a fixed relation with each other. In this manner the two surfaces are worn in to form perfect sealing therebetween and are insured against excessive and uneven wear.

While I have described and illustrated the preferred form of my invention and shown in use with one form of fluid displacement device, it is obvious that various changes can be made in the construction of the valve and that it can be used with other forms of devices without departing from the spirit of my invention.

I claim:

1. A valve comprising in combination a valve structure housing having a chamber provided with a flat valve seat provided with an outlet port opening into said valve chamber, a revoluble shaft journaled in said housing and extending through said seat into said valve chamber, an eccentric disposed in said valve chamber and fixed to said shaft, and an imperforate disk loosely mounted on said eccentric and having its entire face in surface sealing contact with said seat and operable by said eccentric to receive eccentric rotary movement to open and close said port.

2. A valve of the class described comprising in combination a valve housing provided with a valve chamber and a flat valve seat disposed in said chamber and having ports leading into said valve chamber, a disk disposed within said valve chamber and having a plane imperforate face having a surface sealing contact with said flat valve seat, said disk being provided with a pocket, and an eccentric engaging said pocket for imparting eccentric rotary movement to said disk whereby the latter has a lapping engagement with said valve seat to open and close said ports, the fluid pressure in said valve chamber being exerted against said disk to maintain it in sealing engagement with said valve seat.

3. A valve for fluid compressors comprising in combination a housing having a compression chamber and a high pressure chamber, said valve chamber having a flat valve seat provided with an inlet port connecting said compression chamber with said high pressure chamber, a shaft journaled in said housing and extending into said valve chamber through said seat, an eccentric arranged in said chamber and fixed to said shaft, an imperforate disk having a plane surface in sealing contact with said valve seat, said disk being provided with a pocket for receiving said eccentric whereby said disk maintains lapping engagement with said seat to close and open said port, said disk being loosely mounted on said eccentric to permit creeping motion thereof relatively to said eccentric and prevent fixed path of travel of said disk relatively to said seat.

4. A valve for fluid compressors comprising in combination a housing provided with a compression chamber and a high pressure chamber, said high pressure chamber having a flat valve seat provided with a pair of spaced ports establishing communication between said compression chamber and said high pressure chamber, a shaft journaled in said housing and having one end extending into said valve chamber, an eccentric fixed to said shaft, and an imperforate disk loosely mounted on said eccentric and having a flat face in surface sealing contact with said ported seat, said disk having eccentric rotary movement to provide lapping engagement between the contacting surfaces to open and close said ports, said disk being freely mounted to permit said disk to change its position relatively to said ported seat.

5. A lapping valve structure comprising in combination a housing having a compression chamber and a high pressure chamber, said high pressure chamber being provided with a flat valve seat having a plurality of ports opening into said high pressure chamber and communicating with said compression chamber, an eccentric operatively arranged in said chamber, and an imperforate disk having a flat face in sealing contact with said ported valve seat and provided with a recess for receiving said eccentric whereby said disk receives eccentric rotary motion, said disk being held against said valve seat by the fluid pressure prevailing in said high pressure chamber.

6. In a device of the class described, the combination of a housing having a fluid compression chamber and a high pressure chamber, said high pressure chamber being provided with a flat valve seat having a pair of spaced ports opening into said high pressure chamber and communicating with said compression chamber, a shaft journaled in said housing and extending into said high pressure chamber through said valve seat, an eccentric fixed to said shaft in said high pressure chamber, and a disk having a surface sealing contact with said valve seat and held thereagainst by the fluid pressure in said high pressure chamber, said disk being operable by said eccentric to open and close said ports and control the communication between said chambers.

In testimony whereof I hereunto affix my signature this 21st day of May, 1927.

JOHN O. CARREY.